3,167,579
SUBSTITUTED 4,10-DIOXO-5-HYDROXY-1,2,3,4,4a,
9,9a,10-OCTAHYDROANTHRACENES
Thomas Lynn Fields, Pearl River, N.Y., Raymond George Wilkinson, Montvale, N.J., and Andrew Steven Kende, Hartsdale, N.Y., assignors to American Cyanamid Company, Stamford, Conn., a corporation of Maine
No Drawing. Filed Oct. 22, 1962, Ser. No. 232,307
7 Claims. (Cl. 260—465)

This invention relates to new organic compounds and, more particularly, is concerned with novel substituted 4,10 - dioxo - 5 - hydroxy - 1,2,3,4,4a,9,9a,10 - octahydroanthracenes and to methods of preparing these novel compounds. The novel substituted 4,10-dioxo-5-hydroxy-1,2,3,4,4a,9,9a,10-octahydroanthracenes of the present invention may be represented by the following general formula:

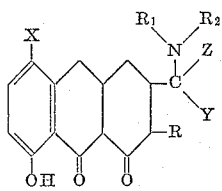

wherein X is hydrogen or halogen, R is hydrogen, carboxy, lower carbalkoxy or phenyl lower carbalkoxy, $R_1$ is hydrogen or methyl, $R_2$ is hydrogen, methyl or formyl, Z is cyano, carboxy or lower carbalkoxy, and Y is hydrogen or cyano. Suitable lower carbalkoxy groups contemplated by the present invention are those having up to about 6 carbon atoms, with carbomethoxy and carbethoxy being preferred. Suitable phenyl lower carbalkoxy groups are, for example, carbobenzyloxy and carbophenethoxy. Halogen is exemplified by chlorine and bromine. It is to be understood that the novel compounds of the present invention may theoretically exist in other tautomeric forms.

The novel compounds of the present invention are particularly useful as chelating, complexing or sequestering agents for polyvalent metallic ions. The complexes formed with polyvalent metallic ions are particularly stable and usually quite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent from these compounds.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water. The novel compounds of the present invention are biologically active and have been found to possess antibacterial activity. The minimal inhibitory concentrations, expressed in gammas per milliliter, of three typical compounds of the present invention against Staphylococcus aureus when measured by a standard turbidimetric procedure are set forth in the following table:

TABLE I

| Compound | Minimal inhibitory conc. in γ/ml. |
|---|---|
| 3-Carbethoxy-8-chloro-α-cyano-N-formyl-4,10-dioxo-5-hydroxy-1,2,3,4,4a,9,9a,10-octahydro-2-anthraceneglycine, ethyl ester | 0.29 |
| 3-Carbobenzyloxy-8-chloro-α-cyano-N-formyl-4,10-dioxo-5-hydroxy-1,2,3,4,4a,9,9a,10-octahydro-2-anthraceneglycine, ethyl ester | 0.042 |
| 3-Carbobenzyloxy-8-chloro-α-dimethylamino-4,10-dioxo-5-hydroxy-1,2,3,4,4a,9,9a,10-octahydro-2-anthracenemalononitrile | 0.164 |

Furthermore, the 3-carbobenzyloxy-8-chloro-α-cyano-N-4,10 - dioxo - 5 - hydroxy - 1,2,3,4,4a,9,9a,10-octahydro-2-anthraceneglycine, ethyl ester inhibits the growth of Bacillus subtilis at a concentration of 8γ/ml. and inhibits the growth of Staphylococcus aureus 209P at a concentration of 31γ/ml.

The novel compounds of the present invention may also be useful in the synthesis of physiologically active antibiotics of the tetracycline series. For example, the novel compounds of the present invention, as set forth in the general formula above, may be converted by standard hydrolytic procedures to the corresponding α-amino-4,10-dioxo - 5 - hydroxy - 1,2,3,4,4a,9,9a,10-octahydroanthracene-2-acetic acids of the following general formula:

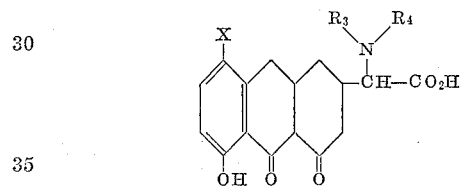

wherein X is hydrogen or halogen and $R_3$ and $R_4$ are each hydrogen or methyl. This intermediate may then be converted to its corresponding acyl halide by treatment with a suitable agent such as oxalyl chloride or thionyl chloride, or alternatively, the mixed carboxylic-carbonic anhydride derivative may be prepared in the usual manner. The corresponding acyl malonate may then be prepared by treating the intermediate acyl derivative with sodium or magnesium diethylmalonate. The acyl malonate may then be cyclized with a strongly basic condensing agent such as sodium hydride, sodium metal, an alkali metal alkoxide, or the like, to the ethyl ester of the corresponding 4-amino-1,2,3,4,4a,5,5a,6,11,11a,12, 12a - dodecahydro - 1,3,11,12 - tetraoxo - 10 - hydroxynaphthacene-2-carboxylic acids of the following general formula:

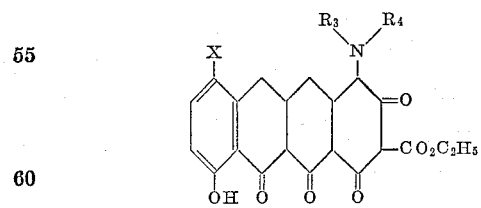

wherein X, $R_3$ and $R_4$ are as previously defined. This dodecahydronaphthacene may then be treated to remove the carbethoxy group by strong acid hydrolysis, or may be converted to the 2-carboxamido derivative by treating with alcoholic ammonia at 70° C.–110° C. in a sealed vessel.

The novel compounds of the present invention may be prepared by the Michael addition of a glycine derivative of the general formula:

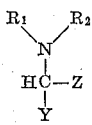

wherein Y, Z, R₁ and R₂ are as hereinabove defined, to a 1,4,4a,9,9a,10-hexahydro-4,10-dioxo-5-hydroxyanthracene of the following general formula:

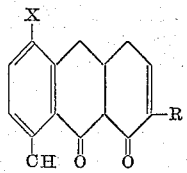

wherein X and R are as hereinabove defined. The 1,4,4a,9,9a,10-hexahydro-4,10-dioxo-5-hydroxyanthracenes of the above general formula where R is carboxy, lower carbalkoxy or phenyl lower carbalkoxy are disclosed and claimed in our copending application Serial No. 155,484, filed November 28, 1961, now Patent No. 3,077,829. The 8-halo-1,4,4a,9,9a,10-hexahydro-4,10-dioxo-5-hydroxyanthracene may be readily prepared by a series of reactions starting with 8-halo-5-hydroxy-1,2,3,4-tetrahydro-4-oxonaphthalene-2-acetaldehyde disclosed and claimed in the copending application of Raymond G. Wilkinson et al., Serial No. 821,093, filed June 18, 1959, now Patent No. 3,102,914. The 8-halo-5-hydroxy-1,2,3,4-tetrahydro-4-oxonaphthalene-2-acetaldehyde is first converted to the diethyl 8-halo-5-hydroxy-1,2,3,4-tetrahydro-4-oxo-2-naphthylethylidene malonate by treatment with diethyl malonate. This malonic ester is then subjected to a Diels-Alder condensation with cyclopentadiene whereby the corresponding cyclopentadiene adduct is obtained. Treatment of the crude cyclopentadiene adduct with sodium hydride in refluxing toluene gives the desired 8-halo-1,4,4a,9,9a,10-hexahydro-4,10-dioxo-5-hydroxyanthracene.

The Michael addition whereby the novel compounds of the present invention are prepared is preferably carried out in an anhydrous solvent such as ethanol, benzene, toluene, diethyl ether, or the like, with a strongly basic condensing agent such as sodium hydride, sodium metal, an alkali metal alkoxide, or the like. The reaction may be carried out over a wide range of temperatures limited, in general, only by the properties of the solvent, over a period of time of from as little as 10 minutes to about 12 hours or more.

The invention will be described in greater detail in conjunction with the following specific examples.

Example 1

8-CHLORO-1,4,4a,9,9a,10-HEXAHYDRO-4,10-DIOXO-5-HYDROXYANTHRACENE

A solution of diethyl 8-chloro-1,2,3,4-tetrahydro-5-hydroxy-4-oxo-2-naphthylidene malonate (15.0 g.) and 8 ml. of freshly distilled cyclopentadiene in 10 ml. of toluene was placed in a bomb and heated to 150° C. for 20 hours. Evaporation of the toluene in vacuo gave a brown oil. This crude Diels-Alder adduct was dissolved in 200 ml. of dry toluene, 10 g. of 50% sodium hydride dispersion was added, and the stirred suspension slowly brought to reflux under a nitrogen atmosphere. After three hours the ultraviolet absorption peak had shifted to a dissymmetric peak with maximum at 349 mμ and considerable absorption between 350 and 370 mμ. The cooled reaction mixture was cautiously acidified by the gradual addition of glacial acetic acid followed by the addition of 300 ml. of ethanol-ethyl acetate. The organic layer was washed with water, dilute sodium bicarbonate solution and then dried over anhydrous magnesium sulfate. Evaporation of the solvent gave a yellow oil. Chromatography of this material on silica gel, using benzene as the eluent, gave 1.12 g. of 8-chloro-1,4,4a,9,9a,10-hexahydro-4,10-dioxo-5-hydroxyanthracene, m.p., 150–151° C.; and also some ethyl 10-chloro-1,4,11,11a,12,12a-hexahydro-5,7-dihydroxy-6-oxo-1,4-methanonaphthacene-4a(6H)-carboxylate.

Example 2

8 - CHLORO - α - CYANO - N - FORMYL - 1,2,3,4,4a,9,9a,10-OCTAHYDRO - 4,10 - DIOXO - 5 - HYDROXY - 2 - ANTHRACENEGLYCINE, ETHYL ESTER

To a solution of sodium hydride (40 mg. of a 50%-in-oil suspension) in 2.0 ml. of dry ethanol was added, with stirring under a nitrogen atmosphere, 250 mg. of ethyl formylamino cyanoacetate followed promptly by 70 mg. of 5-hydroxy-8-chloro-1,4,4a,9,9a,10-hexahydro-4,10-dioxoanthracene in 2.0 ml. of dry benzene. The reaction mixture was stirred under nitrogen at room temperature overnight, then poured into cold dilute acid and extracted with chloroform. The chloroform extract was washed twice with water, dried and evaporated in vacuo. Crystallization of the crude product from ether gave 13 mg. of a yellow solid, M.P. 199–201° C., which exhibited maxima at 2.85, 5.70, 5.87, 6.10, 6.21 and 6.34μ, as expected for the adduct.

Example 3

3 - CARBETHOXY - 8 - CHLORO - α - CYANO - N-FORMYL-1,2,3,4,4a,9,9a,10 - OCTAHYDRO - 4,10 - DIOXO - 5 - HYDROXY-2-ANTHRACENEGLYCINE ETHYL ESTER

Ethyl formylamino cyanoacetate (55 mg.) and ethyl 5 - hydroxy - 8 - chloro - 1,4,4a,9,9a,10 - hexahydro - 4,10-dioxoanthracene-3-carboxylate (48 mg.) were successively added to a solution of 10 mg. of sodium hydride suspension (50% in oil) in 2.5 ml. of benzene and 1.0 ml. of ethanol. The mixture was stirred under nitrogen at room temperature. Within nine minutes a yellow precipitate had formed, and ultraviolet study of the reaction mixture showed addition to be complete. Following the procedure of Example 1 gave 59 mg. of a yellow oil having an infrared spectrum consistent with this adduct. Crystallization from ether gave the lemon yellow product, M.P. 174–175° C. (9 mg.), with maxima at 3.02, 5.70, 5.90, 6.14 and 6.30μ in KBr.

Example 4

3 - CARBOBENZYLOXY - 8 - CHLORO - α - CYANO - N-FORMYL - 1,2,3,4,4a,9,9a,10 - OCTAHYDRO - 4,10 - DIOXO - 5 - HYDROXY-2-ANTHRACENEGLYCINE, ETHYL ESTER

To a stirred slurry of ethyl formylaminocyanoacetate (390 mg.) in dry toluene (5.0 ml.), under a nitrogen atmosphere, was added 200 mg. of a 50% sodium hydride-in-oil suspension followed immediately by 250 mg. of benzyl 5-hydroxy-8-chloro-1,4,4a,9,9a,10-hexahydro-4,10-dioxoanthracene-3-carboxylate. The mixture was stirred at room temperature for one hour, by which time no significant quantity of starting material was detected by ultraviolet spectrum. The reaction mixture was diluted with 12 ml. of toluene, excess sodium hydride was carefully destroyed with acetic acid, and the organic layer washed with 1 N HCl and four times with water. The dried solution was evaporated to a gum, the latter taken up in 15 ml. of chloroform, again washed four times with water, dried and evaporated to a yellow-brown gum. A solution of this gum in 2 ml. of toluene to which 8 ml. of ether was subsequently added gradually deposited crystals at 0° C. After crystallization appeared complete, the yellow product was collected by filtration and dried at 60° C. in vacuo; yield: 143 mg.

Example 5

8-CHLORO-1,2,3,4,4a,9,9a,10-OCTAHYDRO-4,10-DIOXO-5-HYDROXY-2-ANTHRACENEGLYCINE

A mixture of 3-carboxy-8-chloro-α-cyano-N-formyl-1,2,3,4,4a,9,9a,10 - octahydro - 4,10 - dioxo - 5 - hydroxy-2-anthraceneglycine, diethyl ester, five volumes of concentrated hydrochloric acid, and five volumes of acetic acid was held at reflux for 95 minutes. The reaction mixture was diluted with water and washed twice with ethyl acetate. The aqueous layer was concentrated to dryness to give the impure glycine derivative, characterized by maxima at 358 and 346 mμ (in aqueous methanolic HCl).

Example 6

3 - CARBOBENZYLOXY - 8 - CHLORO - α - DIMETHYLAMINO - 1,2,3,4,4a,9,9a,10 - OCTAHYDRO - 4,10 -DIOXO-5-HYDROXY-2-ANTHRACENEMALONITRILE

To a stirred solution of benzyl 8-chloro-5-hydroxy-1,4,4a,9,9a,10 - hexahydro - 4,10 - dioxoanthracene - 3-carboxylate (150 mg.) in dry toluene (10 ml.), under a nitrogen atmosphere, was added 50 mg. of a 50% sodium hydride-in-oil suspension followed immediately by 200 mg. of dimethylaminomalononitrile. The mixture was stirred at room temperature for 1.5 hours, by which time no significant quantity of starting material was detected by ultraviolet spectrum. The reaction mixture was acidified by the cautious addition of glacial acetic acid. After dilution with 10 ml. of ethyl acetate, the solution was washed with 1 N hydrochloric acid and four times with water. The dried solution was concentrated to a gum, which was dissolved in 4 ml. of ether. The yellow crystals which deposited on standing were collected by filtration and dried at 60° in vacuo, yield 75 mg.; M.P. 187–190° C. An analytical sample was obtained by recrystallization from ethyl acetate; M.P. 192–194° C.

Example 7

8 - CHLORO - α - DIMETHYLAMINO - 1,2,3,4,4a,9,9a,10-OCTAHYDRO - 4,10 - DIOXO - 5 - HYDROXY - 2 - ANTHRACENEMALONONITRILE

To a solution of 3-carbobenzyloxy-8-chloro-α-dimethylamino - 1,2,3,4,4a,9,9a,10 - octahydro - 4,10 - dioxo - 5-hydroxy-2-anthracenemalononitrile (100 mg.) in 20 ml. of methyl Cellosolve was added 20 mg. of 10% palladium on carbon. The mixture was subjected to a hydrogen atmosphere at room temperature and atmospheric pressure for 45 minutes. Removal of the catalyst and evaporation of the solution gave 45 mg. of a yellow-tan crystalline product. An analytical sample was obtained by recrystallization from ethyl acetate; M.P. 185–187° C. dec.

What is claimed is:

1. A compound selected from the group consisting of those of the formula:

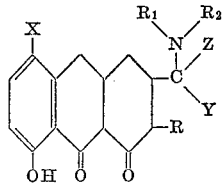

wherein X is selected from the group consisting of hydrogen, chlorine and bromine, R is selected from the group consisting of hydrogen, carboxy, lower carbalkoxy and phenyl lower carbalkoxy, $R_1$ is selected from the group consisting of hydrogen and methyl, $R_2$ is selected from the group consisting of hydrogen, methyl and formyl, Z is selected from the group consisting of cyano, carboxy, and lower carbalkoxy and Y is selected from the group consisting of hydrogen and cyano.

2. 8 - chloro - α - cyano - N - formyl - 1,2,3,4,4a,9,9a,10 - octahydro - 4,10 - dioxo - 5 - hydroxy - 2 - anthraceneglycine, ethyl ester.

3. 3 - carbethoxy - 8 - chloro - α - cyano - N - formyl-1,2,3,4,4a,9,9a,10 - octahydro - 4,10 - dioxo - 5 - hydroxy-2-anthraceneglycine, ethyl ester.

4. 3-carbobenzyloxy - 8 - chloro - α - cyano-N-formyl-1,2,3,4,4a,9,9a,10 - octahydro - 4,10 - dioxo - 5 - hydroxy-2-anthraceneglycine, ethyl ester.

5. 8 - chloro - 1,2,3,4,4a,9,9a,10 - octahydro - 4,10-dioxo-5-hydroxy-2-anthraceneglycine.

6. 3 - carbobenzyloxy - 8 - chloro - α - dimethylamino-1,2,3,4,4a,9,9a,10 - octahydro - 4,10 - dioxo - 5 - hydroxy-2-anthracenemalononitrile.

7. 8 - chloro - α - dimethylamino - 1,2,3,4,4a,9,9a,10-octahydro - 4,10 - dioxo - 5 - hydroxy - 2 - anthracenemalononitrile.

References Cited by the Examiner

Burger et al.: Journal of American Chemical Society, 1936, Volume 58, pp. 1570–1572.

CHARLES B. PARKER, *Primary Examiner.*